United States Patent
Schmidt et al.

(10) Patent No.: US 7,207,686 B2
(45) Date of Patent: Apr. 24, 2007

(54) GRAPHIC BACK-LIGHTING FOR PANEL WITH CONTACT-LESS SWITCH SENSORS

(75) Inventors: Robert Mark Schmidt, Livonia, MI (US); Michael A. Uleski, Roseville, MI (US); Mike Barlow, Southfield, MI (US)

(73) Assignee: Lear Corporation, Southfield, MI (US)

( * ) Notice: Subject to any disclaimer, the term of this patent is extended or adjusted under 35 U.S.C. 154(b) by 212 days.

(21) Appl. No.: 10/960,483

(22) Filed: Oct. 7, 2004
(Under 37 CFR 1.47)

(65) Prior Publication Data

US 2006/0077650 A1    Apr. 13, 2006

(51) Int. Cl.
*B60Q 1/00* (2006.01)

(52) U.S. Cl. .............. 362/26; 362/27; 362/482; 362/489; 362/604

(58) Field of Classification Search ............ 362/26, 362/489, 482, 604, 23, 27
See application file for complete search history.

(56) References Cited

U.S. PATENT DOCUMENTS

| | | | |
|---|---|---|---|
| 4,573,766 A | 3/1986 | Bournay, Jr. et al. | |
| 5,521,342 A | 5/1996 | Bartlet et al. | |
| 6,132,072 A | 10/2000 | Turnbull et al. | |
| 6,347,882 B1 | 2/2002 | Vrudny et al. | |
| 6,652,128 B2 | 11/2003 | Misaras | |
| 6,682,201 B2* | 1/2004 | Kneer et al. ............ | 362/26 |
| 2003/0007344 A1 | 1/2003 | Parker | |
| 2003/0123245 A1 | 7/2003 | Parker et al. | |
| 2003/0123246 A1 | 7/2003 | Parker | |
| 2003/0123247 A1 | 7/2003 | Parker et al. | |
| 2003/0210537 A1 | 11/2003 | Engelmann | |
| 2004/0095402 A1* | 5/2004 | Nakano ................ | 346/102 |
| 2005/0104829 A1* | 5/2005 | Aoki ..................... | 345/89 |

FOREIGN PATENT DOCUMENTS

| JP | 2003-217379 | | 7/2003 |
|---|---|---|---|
| JP | 2003217379 A | * | 7/2003 |

\* cited by examiner

*Primary Examiner*—Renee Luebke
*Assistant Examiner*—Mary Zettl
(74) *Attorney, Agent, or Firm*—Wildman, Harrold, Allen & Dixon LLP

(57) ABSTRACT

A light emitting panel having first and second panels that are constructed of a generally transparent material and that are connected such that the second panel is angularly positioned relative to the first panel. The first panel has first and second opposing surface, wherein at least a portion of the surfaces have a reflective material disposed thereon and an aperture through the reflective material is positioned on the first surface. A light source is associated with the second panel and a contact-less switch sensor is positioned at the second surface.

18 Claims, 2 Drawing Sheets

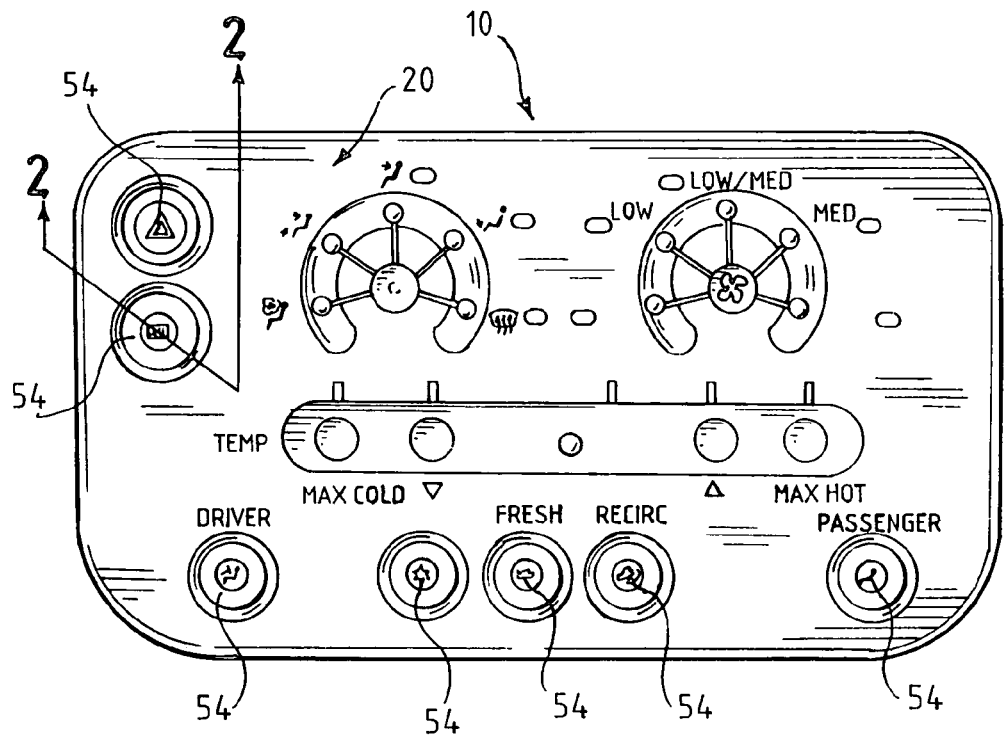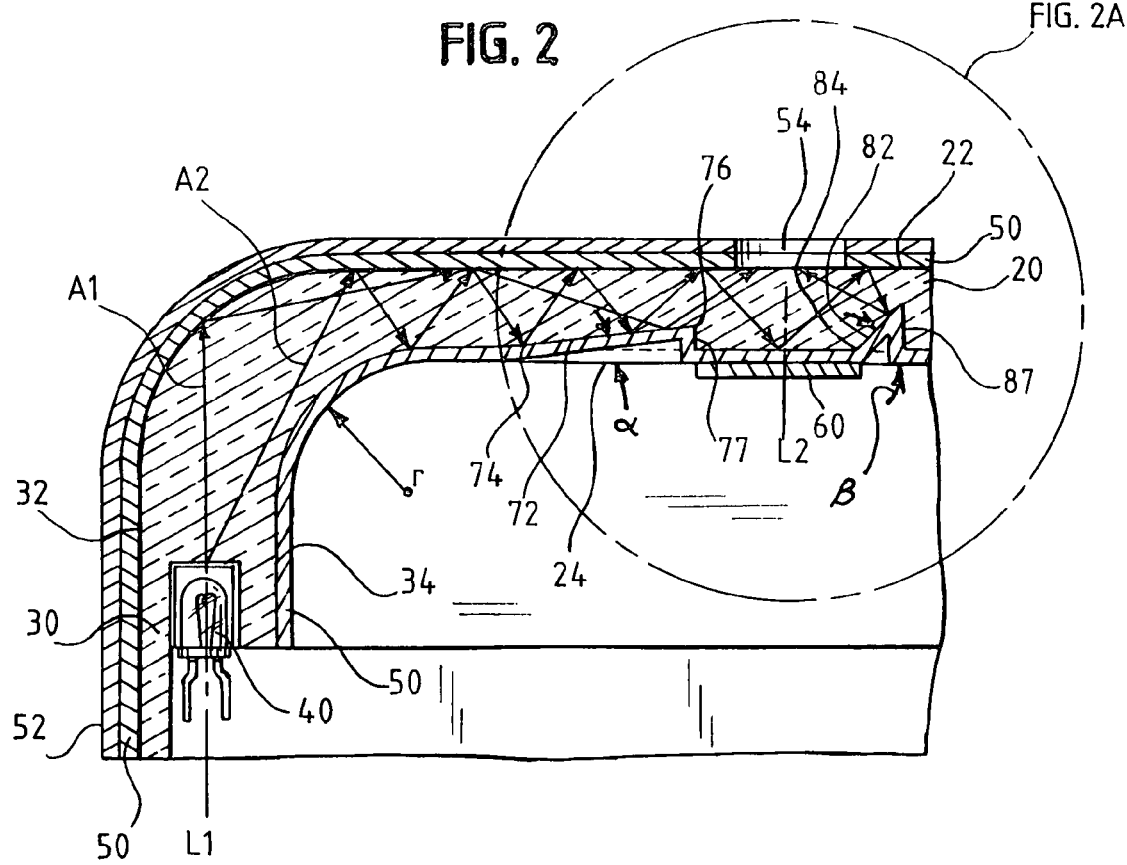

ved by the field effect switch pad — wait.

GRAPHIC BACK-LIGHTING FOR PANEL WITH CONTACT-LESS SWITCH SENSORS

FIELD OF THE INVENTION

This invention relates generally to back-lighting panels. In particular, this invention relates to back-lighting panels that incorporate contact-less switch sensors.

SUMMARY OF THE INVENTION

In one embodiment, the present invention relates to a light emitting panel having first and second panels that are constructed of a generally transparent material and that are connected such that the second panel is angularly positioned relative to the first panel. The first panel has first and second opposing surface, wherein at least a portion of the surfaces have a reflective material disposed thereon and an aperture through the reflective material is positioned on the first surface. A light source is associated with the second panel and a contact-less switch sensor is positioned at the second surface.

BRIEF DESCRIPTION OF THE DRAWINGS

FIG. 1 is an exemplary illustration of a back-lit panel having contact-less switch sensors according to the present invention.

FIG. 2 is a cross sectional view taken along line 2—2 in FIG. 1.

DETAILED DESCRIPTION

Referring to FIG. 1, an exemplary back-lit panel having contact-less switch sensors is shown generally at 10. The exemplary panel described herein is an integrated center stack panel for an automobile, however, it will be understood that the concepts of the current invention could be used or adapted for use for any panel that uses contact-less switch sensors in which back-lighting is desired.

Figure 2A:
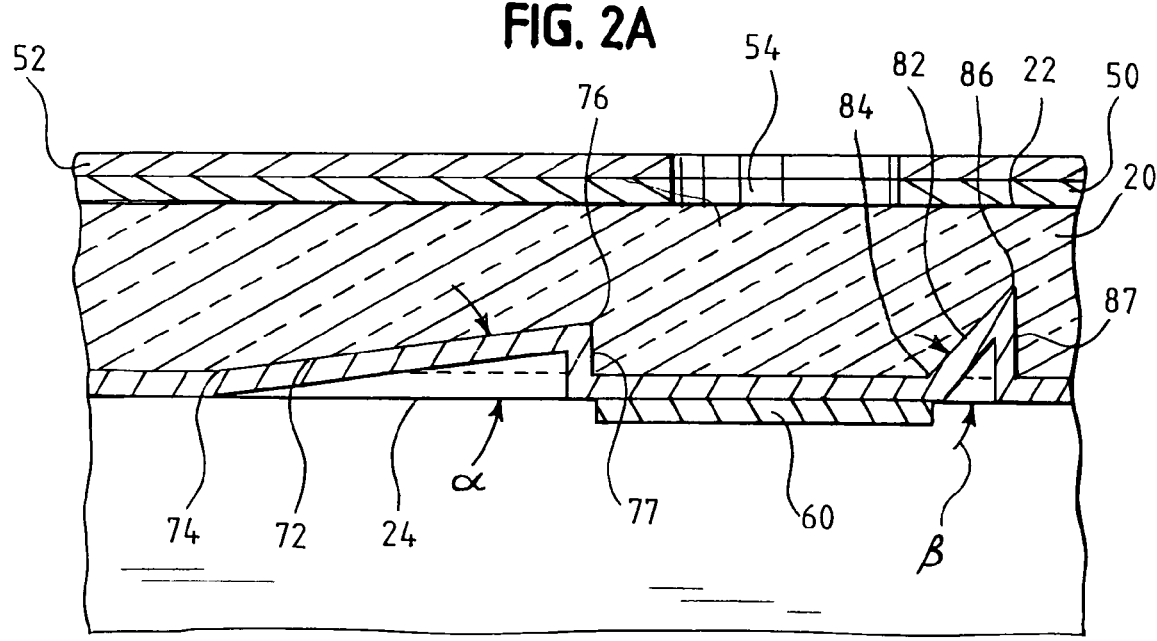
FIG. 2A is an enlarged view of the portion of the back-lit panel designated as FIG. 2A in FIG. 2 without the arrows designated A1 and A2.

Referring to FIGS. 2 and 2A, the panel 10 has a front panel 20 and a side panel 30 that is preferably integrally formed with the front panel 20 such that a predetermined radius r is formed between the front and side panels 20, 30. Alternatively, the front panel 20 and side panel 30 could be connected by any other well known method. The radius "r" formed between the front and side panels 20, 30 efficiently transmits light from the light emitting diode 40 (described in more detail below) to the front panel 20. The front and side panels 20, 30 are preferably constructed of a transparent material, such as a polycarbonate or acrylic, and can be manufactured using a variety of well known methods such as injection molding, vacuum molding, thermal forming, etc. Alternatively, the front and side panels 20, 30 can be constructed out of a translucent material or any other material that will allow the transmission of light through the material.

The front panel 20 has a front surface 22 and a back surface 24 and the side panel 30 has an outside surface 32 that is contiguous with the front surface 22 of the front panel 20 and an inside surface 34 that is contiguous with the back surface 24 of the front panel 20. The front and back surfaces 22, 24 of the front panel 20 and the outside and inside surfaces 32, 34 of the side panel 30 have a reflective material 50 disposed thereon to reflect light within the front and side panels 20, 30 and prevent light from being emitted from the panels. The reflective material 50 is preferably a sprayed on white paint but can be a white or other light reflective color paint or ink that is painted or screen printed onto the surfaces 22, 24, 34, and 32 or can be any other material applied to the surfaces through any other process appropriate for a given application as long as the material is able to reflect light and prevent it from being emitted from undesired areas of the front and side panels 20, 30. In addition, in the preferred embodiment, a second material 52 is disposed over the reflective material 50 on the front and outside surfaces 22, 32 for aesthetic purposes. For example, the panel could be painted to match the color of the interior of the automobile.

A light source 40, preferably a surface mounted light emitting diode (LED), having a longitudinal axis L1 is positioned within the side panel 30 to provide the illumination for the back-lighting of the panel. The light source 40 is positioned within a cavity formed in the side panel 30 for receiving the light source 40, however any other well known method could also be used. Alternatively, rather than a surface mount LED, a leaded LED, incandescent lamp, or other appropriate light source may also be used. The positioning of the light source 40 in the side panel 30 allows the front panel 20 to have a substantially uniform thickness and avoids creating thick cross sections in the front panel 20 that will cause sinks or voids in the front surface 22.

Light is emitted from the front panel 20 through an aperture 54 that is formed through the reflective material 50 and the second material 52. The aperture 54 can be formed as a graphic, such as a hazard light indicator, rear defrost indicator, etc. as shown in FIG. 1, can be formed as text, or can be any other aperture 54 that is appropriate for a given application. The aperture 54 can be formed using any of many well known techniques such as laser etching the aperture 54 through the reflective and second materials 50, 52, masking the aperture 54 during application of the reflective and second materials 50, etc.

A field effect switch pad 60 having a longitudinal axis L2 is secured to the reflective material 50 on the back surface 24 of the front panel 20, or alternatively directly to the back surface 24 of the front panel 20, directly opposite the aperture 54. The field effect switch pad 60 is secured by an adhesive or can be secured using any other method appropriate to the particular reflective material or front panel material used such as by heat staking, cold staking, fasteners, etc. Alternatively, rather than a field effect switch pad, a capacitive switch pad, resistive switch pad, or any other contact-less switch sensor may be used as appropriate for a given application.

Figure 3:
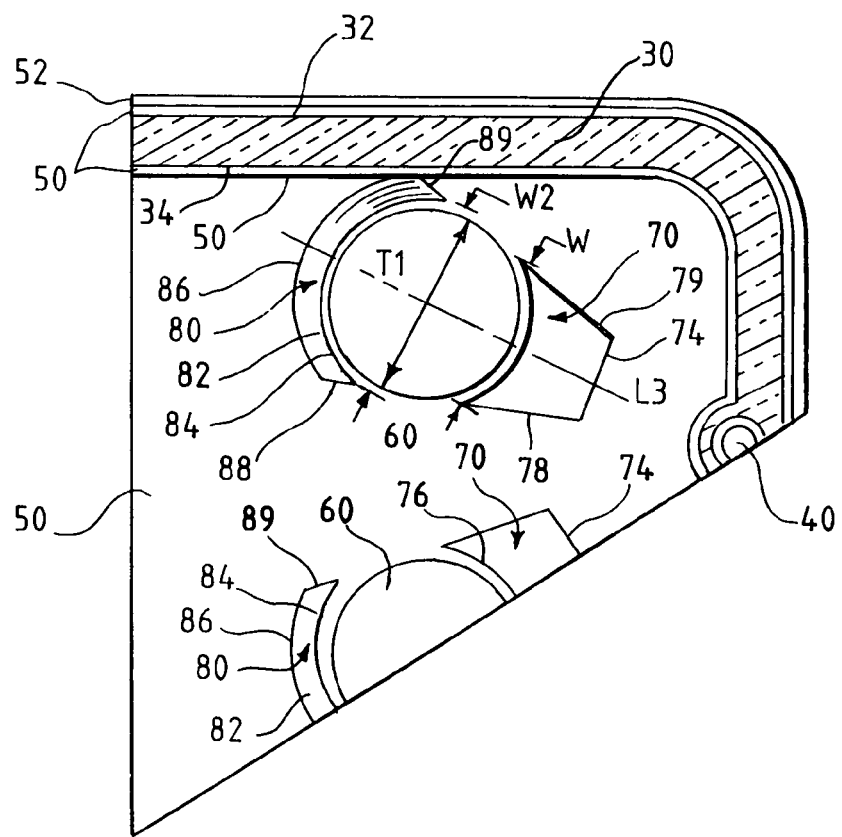
FIG. 3 is a back view of the cross sectional view of FIG. 2.

Referring to FIGS. 2, 2A, and 3, a compression ramp 70 is formed in the back surface 24 of the front panel 20 to shorten the reflective frequency of a portion of the light within the front panel 20 to reflect and redirect this light towards the aperture 54. The compression ramp 70 has a longitudinal axis L3 and is positioned between the light source 40 and the field effect switch pad 60 such that the longitudinal axes of the light source, field effect switch pad, and compression ramp L1, L2, and L3 are generally aligned in the same plane (FIG. 3).

In the preferred embodiment, the compression ramp 70 has a reflective wall 72, an end wall 77, and a pair of side walls 78, 79. The reflective wall 72 is generally planar and provides reflection, in conjunction with the reflective material 50 positioned behind the reflective wall 72, and redirection of light within the front panel 20. Reflective wall 72 extends along its longitudinal axis from the back surface 24 at a first edge 74 and into the front panel 20 towards the field effect switch pad 60, to a second edge 76. The angle formed between the back surface 24 and the reflective wall 72 (shown in FIGS. 2 and 2A as α) is between 2–5 degrees. The first edge 74 is flush with the back surface 24 and generally perpendicular to the longitudinal axis L3 and the second edge 76 is preferably proximate to the edge of the field effect switch pad 60. In the preferred embodiment, the second edge 76 has a width that is approximately the same dimension as the width of the field effect switch pad 60 and the contour of the second edge 76 is substantially the same as the outer contour of the field effect switch pad 60. For example, as shown in FIG. 3, in the preferred embodiment of the invention, the field effect switch pad 60 is circular (although it could be any shape desired), therefore, the width W of the second edge 76 is approximately the same as the diameter D of the field effect switch pad 60 and the second edge 76 is curved to match the outer contour of the field effect switch pad 60. The end wall 77 is substantially perpendicular to the back surface 24 and extends from the back surface 24 to the second edge 76 of the reflective wall 72, as seen in FIGS. 2 and 2A. The side walls 78, 79 are also substantially perpendicular to the back surface 24 and interconnect the reflective wall 72 and the end wall 77. Although the compression ramp 70 has been described herein as preferably generally triangular in cross-sectional geometry (as seen in FIGS. 2 and 2A), it will be understood that the compression ramp 70 could have any geometry desired as long as it has a reflective wall that can shorten the reflective frequency of a portion of the light within the front panel 20 to reflect and redirect this light towards the aperture 54.

A reflector ramp 80 is also formed in the back surface 24 of the front panel 20 to redirect a portion of the light waves that have been reflected past the aperture 54 back towards the aperture 54. The reflector ramp 80 has a transverse axis T1 and is positioned on the opposite side of the field effect switch pad 60 from the compression ramp 70 such that the longitudinal axes of the LED, field effect switch pad, and compression ramp L1, L2, and L3 and the transverse axis of the reflector ramp T1 are aligned generally in the same plane (FIG. 3)

In the preferred embodiment, the reflector ramp 80 has a reflective wall 82, an end wall 87, and a pair of side walls 88, 89. The reflective wall 82 is generally planar and provides reflection, in conjunction with the reflective material 50 positioned behind the reflective wall 82, and redirection of the light that has been reflected past the aperture 54 back towards the aperture 54. The reflective wall 82 extends from a first edge 84, into the front panel 20 and away from the field effect switch pad 60, to a second edge 86. The angle formed between the back surface 24 and the reflective wall 82 (shown in FIGS. 2 and 2A as β) is approximately 45 degrees. In the preferred embodiment, as seen in FIG. 3, the first edge 84 has a width that is approximately the same dimension as the width of the field effect switch pad 60 and the contour of the first edge 84 is substantially the same as the outer contour of the field effect switch pad 60. For example, as shown in FIG. 3, in the preferred embodiment of the invention the field effect switch pad 60 is circular (although it could be any shape desired), therefore, the width W2 of the first edge 84 is approximately the same as the diameter D of the field effect switch pad 60 and the first edge 84 is curved to match the outer contour of the field effect switch pad 60. The end wall 87 is substantially perpendicular to the back surface 24 and extends from the back surface 24 to the second edge 86 of the reflective wall 82. The side walls 88, 89 are also substantially perpendicular to the back surface 24 and interconnect the reflective wall 82 and the end wall 87. Although the reflector ramp 80 has been described herein as preferably generally triangular in cross-sectional geometry (as seen in FIGS. 2 and 2A), it will be understood that the reflector ramp 80 could have any geometry desired as long as it has a reflective wall that can provide reflection and redirection of the light that has been reflected past the aperture 54 back towards the aperture 54.

The aperture 54, field effect switch 60, compression ramp 70, and reflector ramp 80 have been described above as they would be used for a single back-lit contact-less switch in the panel 10. It will be understood that these elements could be repeated as many times as required for as many back-lit contact-less switches as are required on a given panel for a given application.

Referring to FIG. 2, in operation light rays (represented in FIG. 2 as directional arrows A1 and A2) are emitted from the light source 40 into the side panel 30, which is in angular relationship to front panel 20. As the light rays travel through the side panel 30 they will eventually encounter the outside or inside surface 32, 34 of the side panel 30 or the front surface 22 of the front panel 20 and will be reflected by the reflective material 50 thereon. Because radius "r" is positioned between the side panel 30 and the front panel 20 a substantial portion of the light rays from the light source 40 will be reflected and redirected into the front panel 20 and continue to reflect within the front panel 20 towards the aperture 54 due to the reflective material 50 on the front and back surfaces 22, 24 of the front panel 20. As can be seen from the light wave indicated as A1, some light waves emitted from the light source 40 will be reflected into and along the front panel 20 at a shallow angle and because of the angle of reflection may reflect past the aperture. Some of these light waves will reflect off of the reflective wall 72 of the compression ramp 70, which will shorten the reflective frequency of the light waves and redirect more of these light waves towards the aperture 54. Similarly, as can be seen from the light wave indicated as A2, even with the compression ramp 70, some light waves emitted from the light source 40 will be reflected past the aperture 54. Some of these light waves will reflect off of the reflective wall 82 of the reflector ramp 80, which will redirect more of these light waves back towards the aperture 54. The increase of light waves directed towards the aperture 54 from the compression ramp 70 and the reflector ramp 80 results in an increase of light waves emitted through the aperture 54, and therefore a brighter graphic is displayed on the panel 10.

The foregoing description of the preferred embodiments of the invention have been presented for purposes of illustration and description, and are not intended to be exhaustive or to limit the invention to the precise forms disclosed. The descriptions were selected to best explain the principles of the invention and their practical application to enable other skills in the art to best utilize the invention in various embodiments and various modifications as are suited to the particular use contemplated. It is intended that the scope of the invention not be limited by the specification, but be defined by the claims set forth below.

What is claimed is:
1. A light emitting panel, comprising:
  a first panel, constructed of a generally transparent material, having first and second opposing surfaces, in which at least a portion of the first and second surfaces of the first panel have a reflective material disposed thereon and an aperture through the reflective material is positioned on the first surface;

a second panel, constructed of a generally transparent material, connected to the first panel and angularly positioned relative to the first panel;

a light source associated with the second panel; and a contact-less switch sensor positioned at the second surface.

2. A light emitting panel, as recited in claim 1, wherein the second panel is integrally formed with the first panel.

3. A light emitting panel, as recited in claim 1, wherein a predetermined radius is formed between the first and second panels.

4. A light emitting panel, as recited in claim 1, wherein the light source is disposed within the second panel.

5. A light emitting panel, as recited in claim 1, wherein the second panel has first and second opposing surfaces and at least a portion of the first and second surfaces of the second panel have a reflective material disposed thereon.

6. A light emitting panel, as recited in claim 1, wherein the contact-less switch sensor is positioned generally opposite the aperture.

7. A light emitting panel, as recited in claim 1, wherein the light source is a light emitting diode.

8. A light emitting panel, as recited in claim 1, wherein the contact-less switch sensor is a field effect switch pad.

9. A light emitting panel, as recited in claim 1, further comprising a compression ramp formed in the first panel proximal the contact-less switch sensor.

10. A light emitting panel, as recited in claim 9, wherein the compression ramp is disposed between the light source and the contact-less switch sensor.

11. A light emitting panel, as recited in claim 9, wherein the compression ramp comprises a reflective wall extending from a first edge and projecting into the first panel toward the contact-less switch sensor to a second edge, wherein the first edge of the reflective wall of the compression ramp is coplanar with a surface of the first panel, the second edge of the reflective wall of the compression ramp is proximal the contact-less switch sensor.

12. A light emitting panel, as recited in claim 11, wherein the second edge of the reflective wall of the compression ramp has a width that is substantially the same as a width of the contact-less switch sensor and a contour that conforms to the contour of the contact-less switch sensor.

13. A light emitting panel, as recited in claim 11, wherein and the angle formed between the reflective wall of the compression ramp and the surface of the first panel is approximately 2–5 degrees.

14. A light emitting panel, as recited in claim 9, further comprising a reflector ramp formed in the first panel proximal the contact-less switch sensor.

15. A light emitting panel, as recited in claim 14, wherein the contact-less switch sensor is disposed between the light source and the reflector ramp.

16. A light emitting panel, as recited in claim 14, wherein the reflector ramp comprises a reflective wall extending from a first edge and projecting into the front panel and away from the contact-less switch to a second edge, wherein the first edge of the reflective wall of the reflector ramp is coplanar with a surface of the first panel, the second edge of the reflective wall of the reflector ramp is proximal the contact-less switch.

17. A light emitting panel, as recited in claim 16, wherein the first edge of the reflective wall of the reflector ramp has a width that is substantially the same as a width of the contact-less switch sensor and a contour that conforms to the contour of the contact-less switch sensor.

18. A light emitting panel, as recited in claim 16, wherein the angle formed between the reflective wall of the reflector ramp and the surface of the first panel is approximately 45 degrees.

* * * * *